(12) United States Patent
Stewart-Barnett (10) Patent No.: US 8,727,183 B2
(45) Date of Patent: May 20, 2014

(54) WATER DISPENSER WITH FLOW-INTERRUPTIBLE DISPENSING ARRANGEMENT

(75) Inventor: Roger Stewart-Barnett, Port Melbourne (AU)

(73) Assignee: Filterezi Pty Ltd, Robina, Queensland (AU)

( * ) Notice: Subject to any disclaimer, the term of this patent is extended or adjusted under 35 U.S.C. 154(b) by 137 days.

(21) Appl. No.: 13/145,413

(22) PCT Filed: Jan. 20, 2010

(86) PCT No.: PCT/AU2010/000052
§ 371 (c)(1),
(2), (4) Date: Aug. 2, 2011

(87) PCT Pub. No.: WO2010/083559
PCT Pub. Date: Jul. 29, 2010

(65) Prior Publication Data
US 2011/0284585 A1    Nov. 24, 2011

(30) Foreign Application Priority Data
Jan. 20, 2009    (AU) .................... 2009900206

(51) Int. Cl.
*B67D 7/76* (2010.01)
(52) U.S. Cl.
USPC ............... 222/189.06; 222/146.6; 222/185.1
(58) Field of Classification Search
USPC ............ 62/389, 397; 141/319, 320, 363, 364; 210/172.1, 172.6, 232, 249, 250, 251, 210/472–474, 484; 222/146.6, 185.1, 222/189.06, 189.09, 165, 166, 325
See application file for complete search history.

(56) References Cited

U.S. PATENT DOCUMENTS

| | | | | |
|---|---|---|---|---|
| 2,910,391 A * | 10/1959 | Toulmin, Jr. | .................. | 134/25.2 |
| 3,042,267 A * | 7/1962 | Reynard | ..................... | 222/185.1 |
| 3,841,484 A * | 10/1974 | Domnick | ........................ | 210/95 |
| 3,923,662 A * | 12/1975 | O'Brien | ........................ | 210/251 |
| 4,386,718 A * | 6/1983 | Stewart et al. | ............. | 222/185.1 |
| 4,523,697 A * | 6/1985 | Jeans | ......................... | 222/185.1 |
| 4,535,918 A * | 8/1985 | Heiligman et al. | ........... | 222/209 |
| 5,003,790 A * | 4/1991 | Goupil | ............................ | 62/389 |
| 5,111,966 A * | 5/1992 | Fridman | ........................... | 222/1 |
| 5,232,590 A * | 8/1993 | Reid | ........................ | 210/257.2 |
| 5,280,764 A | 1/1994 | Levinrad | | |
| 5,281,309 A * | 1/1994 | Greene | ........................ | 202/181 |
| 5,526,961 A | 6/1996 | Burrows | | |
| 5,567,308 A * | 10/1996 | Visser | .......................... | 210/232 |
| 5,616,243 A * | 4/1997 | Levy | ............................. | 210/282 |
| 5,730,863 A * | 3/1998 | Howlings et al. | ............. | 210/109 |
| 5,823,007 A | 10/1998 | Chang | | |
| 6,167,921 B1 * | 1/2001 | Busick et al. | ................... | 141/18 |
| 8,377,299 B2 * | 2/2013 | Black et al. | ................... | 210/232 |
| 2002/0092813 A1* | 7/2002 | Radford | ........................ | 210/767 |
| 2002/0129869 A1* | 9/2002 | Hydak et al. | .................. | 141/352 |

(Continued)

*Primary Examiner* — Kevin P Shaver
*Assistant Examiner* — Patrick M Buechner
(74) *Attorney, Agent, or Firm* — Harness, Dickey & Pierce, P.L.C.

(57) ABSTRACT

A water dispenser having a water reservoir for retaining water to be dispensed, a dispensing arrangement for flow-interruptible dispensing of water from the reservoir and a filtration unit in fluid flow connection with the reservoir, the filtration unit being located externally to the water reservoir.

19 Claims, 5 Drawing Sheets

(56) References Cited

U.S. PATENT DOCUMENTS

| | | | |
|---|---|---|---|
| 2003/0183649 A1* | 10/2003 | Tan et al. | 222/67 |
| 2004/0045206 A1* | 3/2004 | Witham | 40/642.02 |
| 2004/0129723 A1* | 7/2004 | Meder et al. | 222/113 |
| 2005/0092769 A1* | 5/2005 | Macler et al. | 222/83 |
| 2005/0230293 A1* | 10/2005 | Anderson | 210/106 |
| 2006/0026987 A1* | 2/2006 | Wetherbee | 62/397 |
| 2008/0035241 A1* | 2/2008 | Wittbold | 141/361 |
| 2008/0050290 A1* | 2/2008 | Yui | 422/186.1 |

\* cited by examiner

WATER DISPENSER WITH FLOW-INTERRUPTIBLE DISPENSING ARRANGEMENT

CROSS-REFERENCE TO RELATED APPLICATIONS

This application is a 371 U.S. National Stage of International Application No. PCT/AU2010/000052, filed Jan. 20, 2010. This application claims priority to Australian Patent Application No. 2009900206, filed Jan. 20, 2009. The disclosures of the above applications are incorporated herein by reference.

FIELD OF THE INVENTION

This invention relates to water filtration. More particularly, this invention relates to a filtration system for a water dispenser, to a water dispenser, and to a retrofittable water filtration kit for a water dispenser.

BACKGROUND ART

The following discussion of the background art is intended to facilitate an understanding of the present invention only. The discussion is not an acknowledgement or admission that any of the material referred to is or was part of the common general knowledge as at the priority date of the application.

Water dispensers, also commonly known as water-coolers, are often found in homes and workplaces where they provide a convenient means for dispensing water. Many of these water dispensers contain heat exchangers that allow the dispenser to dispense chilled water as well as, in certain cases, heated water.

Certain such water dispensers may be plumbed into a pre-existing water supply where they operate at relatively high water heads or pressures. These arrangements are, however, rather limiting as the water dispenser cannot be moved without it having to be disconnected and re-connected to the plumbing at a suitable station. Such units are therefore generally considered to be fixed or stationary and cannot easily be moved from one station in a building or office to another. Such units are also referred to as "point of use" or POV coolers.

The majority of coolers are free standing and not plumbed in, and generally require the purchasing of bulk bottled water by users thereof. This type of water dispenser is of the inverted bottle-type, wherein an inverted water reservoir is placed on to a water cooling/heating dispenser. These units typically operate at much lower water head than the above-mentioned plumbed fixtures, as these units are gravity fed and fluid flow volumes and rates are mostly dependent on the effects of gravity on the water within the reservoir. As such, these dispensers usually operate at fluid pressures of less than, say, 5 psi, sometimes as low as 1 psi, or even less. However, as no external plumbing is required such units are typically quite easy to install, operate, and relocate if so required. However, these so-called "spring water" coolers can be very costly in the long run, as they rely on the purchase of bulk bottled water on a continuous basis. To provide a source of clean, purified water, the water sold as spring water in such systems is frequently obtained by the supplier from a domestic water supply in unfiltered or unpurified form. It then needs to be filtered and sold as spring water, which increases the running costs of such spring water units passed through a filtration unit.

Other gravity-fed water dispensers of which the Applicant is aware have an in-line filter placed in direct fluid contact within the reservoir. These filtration units house filters or cartridges comprising mostly activated carbon, which filter out impurities through a process of adsorption. Due to fluid flow constraints in such systems, the filters have to be placed in a direct fluid flow line between the reservoir and the cooling system, to ensure adequate fluid flow from the reservoir, through the filtration unit, a cooling tank, and through a dispensing spout. A major shortcoming of these systems is that the water filtration unit, due to its placement within the water tank, is exposed to UV irradiation. This is detrimental to the carbon filtration unit, as it provides suitable conditions for accelerated growth of bacteria and other water-borne pathogens. The filtration unit effectively then becomes a seeding unit for pathogen contamination and dispersion in the water flowing from the filter. The placement of the filtration unit in such systems also makes it difficult to access the filtration unit to replace the filter cartridge without draining or removing the tap water reservoir tank which houses the filter.

It is an object of this invention to provide a water dispenser, filtration unit, and kit which addresses certain of the shortcomings of the prior art.

DISCLOSURE OF THE INVENTION

Broadly, according to one aspect of the invention, there is provided a water dispenser, the water dispenser comprising a water reservoir for retaining water to be dispensed, a dispensing arrangement for flow-interruptible dispensing of water from the reservoir and a filtration unit in fluid flow connection with the reservoir, the filtration unit being located externally to the water reservoir; wherein the filtration unit is connected to the reservoir and to the dispensing arrangement via a first inflow conduit for receiving fluid from the reservoir and a second outflow conduit for channelling filtered water from the filtration unit to the dispensing arrangement and the water dispenser comprises a connector hub comprising a seating formation for receiving and seating the water reservoir in an inverted arrangement; wherein the connector hub comprises a dish comprising first and second connectors for receiving the first inflow conduit and the second outflow conduit.

According to another aspect of the invention, there is provided a filtration system for a water dispenser, the filtration system comprising a filtration unit, connectable in fluid flow with a water reservoir of a water dispenser, the filtration unit being locatable externally to the water reservoir of the dispenser.

The filtration unit may comprise a housing or magazine for receiving a filter cartridge. The housing/magazine may be opaque and/or UV impervious. The filtration unit may comprise a releasable cap for closure of the filtration cavity defined within the housing/magazine. The cap facilitates the removal and replacement of spent filter cartridges.

The filtration unit may be connected to the reservoir and dispensing arrangement via a first inflow conduit for receiving water from the reservoir, and a second outflow conduit for channelling filtered water from the filtration unit to the dispensing arrangement. The inflow and outflow conduits or tubes may be locatable either at, or proximal to, the operative top or the bottom of the filtration unit. In one embodiment, both the inflow and outflow conduits/tubes are connected to the cap in a radially opposed fashion.

Typically, the filtration unit may be positioned such that it is at, or slightly below, the lowest water level of the reservoir, thereby ensuring adequate fluid flow and pressurisation through the filtration unit irrespective of the amount of water remaining in the water reservoir. The cross-sections and lengths of the conduits, as well as the dimensions of the water filtration unit, allow the filtration unit to be positioned lower than the reservoir, yet still remain adequately pressurised to ensure sufficient fluid flow through the filtration unit. In one embodiment of the invention, the filtration unit is placed at or near ground level. The cross-sections and lengths of the conduits may be sufficient to ensure fluid flow of approximately 0.5 L to 5 L per minute, preferably about 1 L per minute.

The filtration unit may have attachment means provided therewith for attachment of the filtration unit to the water dispenser.

A secondary tank, preferably in the form of a chill tank for chilling the water to be dispensed, may be interposed between the filtration unit and the dispensing arrangement. The chill tank may be dimensioned to receive a charge of filtered water sufficient to allow a user to fill at least a vessel of average size before requiring replenishment from the reservoir via the filtration unit. As such, the chill tank may typically hold between 0.5 L and 20 L of filtered water, preferably between 3 and 12 L, most preferably about 10 L of water.

The inflow and outflow conduits may be connected or connectable to a connector hub, the connector hub having means for receiving and seating an inverted water reservoir or bottle. The connector hub preferably comprises a dish comprising connectors for receiving the inflow and outflow conduits leading to and from the filtration unit.

As such, a further aspect of the invention provides a connector hub for regulating fluid flow in a water dispenser having a water reservoir, the connector hub comprising a dish having at least two throughbore connectors disposed thereupon, the connectors being spaced within the dish such that a first connector defines a securing formation for receiving a fluid outflow conduit to the filtration unit of the invention, and the second connector defining a securing formation for a fluid inflow conduit from the filtration unit and a seating formation provided on the dish, the seating formation serving to securely seat a fluid outlet of a water reservoir in fluid flow fashion with a secondary tank provided within the water dispenser.

The first and second connectors may be in the form of through-bore male ports to which the respective conduits are attachable in a friction fit manner. As such, the ports or connectors each may be provided with a tapered end providing a male frusto-conical sealing surface engageable with a conforming internal surface of each of the inflow and outflow conduits.

The dish may be annular or any other suitable shape. The dish may be stepped and may define a raised annular flange for secure seating of the connector hub on an upper edge of the secondary tank.

The seating formation may be in the form of an operatively upwardly extending collared formation provided on an operatively upper face of the dish, the seating formation having an inner diameter dimensioned to accept an outflow of a water reservoir for use in the water cooler, and having sufficient rigidity to support the water reservoir. The collared seating formation may, in one embodiment, be provided centrally on the dish, to ensure sufficient stability of the water dispenser when the reservoir is placed thereupon. The collared seating may be provided with an internal circumferential seal to ensure a snug, water-tight fit with the neck or outlet of the water reservoir when inserted in the seat.

The seat for the water reservoir outlet may have an internal aperture defined therein through which water from the water reservoir may be led to the filtration unit. The internal aperture may be in the form of a through-bore supplementary ported connector to which is connectable a conduit leading toward the fluid outflow connector defined in the dish. The fluid outflow may be connected in fluid flow fashion to the filtration device, with filtered water from the filtration device being fed to the secondary tank via the first connector provided in the dish. Water in the secondary tank may then be dispensed from the dispenser via the interruptible flow dispensing means/spouts.

As such, the connector hub may be provided with a connector and flow conduits to provide a steady flow of water from the reservoir, through the supplementary ported connector, via a U-tube conduit or other connector piece, to an inflow conduit connected to the first connector and leading to the filtration unit, and from the filtration unit into the chill tank via a further ported connector defined within the connector hub.

The connector hub may be provided with two or more lugs positioned peripherally thereupon, preferably on an operatively upper edge of the flange, the lugs being spaced from one another so as to define friction fit guides for the inflow and outflow conduits leading to and from the filtration unit and the dispenser. The connector hub may be of unitary construction and may be in the form of a moulding or extrusion made of high density plastics such as polyethylene.

The connector hub may be provided with an operatively downwardly extending circumferential skirt. The skirt is dimensioned to allow for the secure placement of an O-ring, D-ring, or other suitable circumferential seal, the seal serving to provide a substantially water-tight seal between the connector hub and the secondary tank. The connector hub may be press-fitted onto the secondary tank and held in position by slight interference fit.

A bleed hole or vent is provided in fluid flow connection with the chill tank to allow for air to escape when the chill tank is being filled, and to similarly allow for the ingress of air when the chill tank is being emptied during dispensing. In one embodiment, the bleed hole is defined within the water reservoir seat defined within the connector hub, with an upwardly extending snorkel tube or vent tube to guide air escaping from the chill tank, through the bleed hole, to an upper part of the water reservoir, above a water line. The bleed hole may be defined centrally in the water reservoir seat and may be in the form of a through-bore male connector to which the snorkel tube or vent tube is attachable in a friction fit manner. The connector may be provided with a tapered end providing a male frusto-conical sealing surface engageable with a conforming internal surface of the snorkel tube. The connector further may be provided with a small antechamber proximal the chill tank, the antechamber having a sufficiently elevated apertured ceiling to ensure that water from the chill tank does not enter the snorkel tube, while allowing air bubbles to escape into the snorkel tube.

An operatively upper end of the snorkel tube may terminate in an air filter for filtering air drawn into the chill tank during dispensing. The air filter may be elevated so as to be above the water line.

The chill tank may be chilled by connecting it to a heat exchanger or cooling fan. The heat exchanger or cooling fan may be external to the water dispenser and may be connectable to a standalone power supply or to a mains electricity supply.

The dispensing arrangement may be in the form of a flow-interruptible dispensing spout or other selectively activatable flow interruption or stopcock means.

The filtration unit may be retrofittable to existing water coolers or water dispensers.

The filtration unit may be provided with any suitable water filtration cartridge, such as silver-impregnated activated carbon filter media capable of removing chlorine and organic chemicals by adsorption. The cartridge may be selected to ensure a flow rate of not less than 0.5 L per minute through the filtration unit, preferably between 0.5 L and 5 L per minute, most more than about 1 L per minute.

As such, the invention, in another aspect thereof, also provides for a retrofittable water filtration kit for a water dispenser, the kit comprising a filter housing as defined hereinbefore, conduits for connecting the water filter housing to the reservoir and dispensing spouts respectively in fluid flow connection and a connector hub as defined hereinbefore.

The kit further may include an operating and installation manual. In addition, the kit may include a filter cartridge having sufficient flow characteristics and/or density suitable for use in the filtration kit of the invention.

BRIEF DESCRIPTION OF THE DRAWINGS

The invention will now be described hereinafter with reference to the following non-limiting examples and drawings, in which.

BEST MODE(S) FOR CARRYING OUT THE INVENTION

Throughout the specification and claims, unless the context requires otherwise, the word "comprise" or variations such as "comprises" or "comprising", will be understood to imply the inclusion of a stated integer or group of integers but not the exclusion of any other integer or group of integers.

In the drawings, reference numeral 10 is used to generally indicate a water dispenser in accordance with one aspect of the invention, while reference numeral 12 is used to indicate a filtration system in accordance with another aspect of the invention.

Figure 1A:
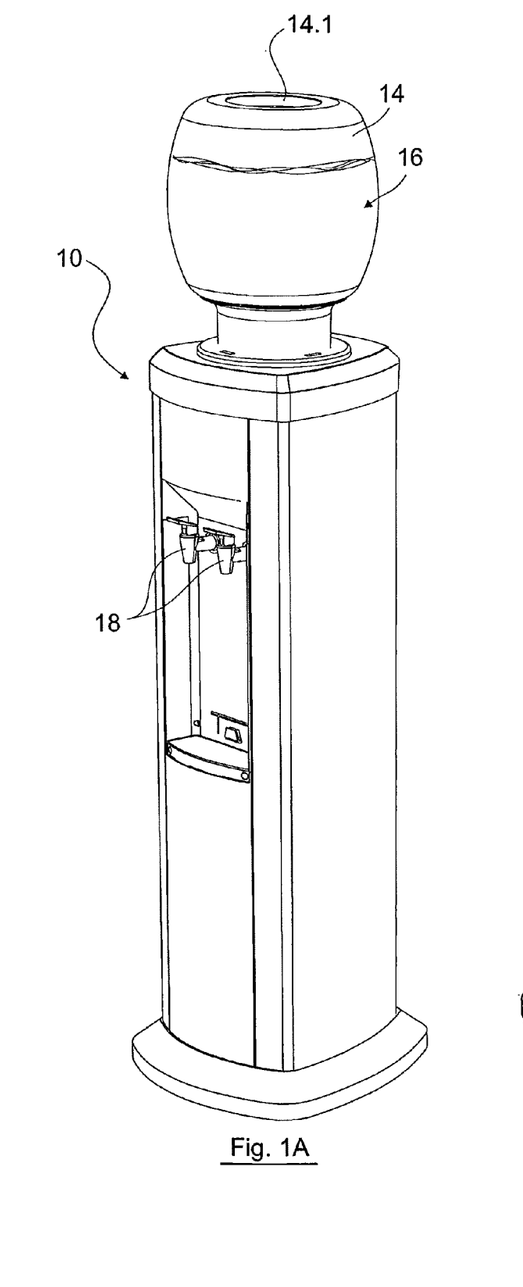
FIG. 1a shows an oblique three-dimensional front view of a water cooler including a filtration system in accordance with one aspect of the invention.
Figure 1B:
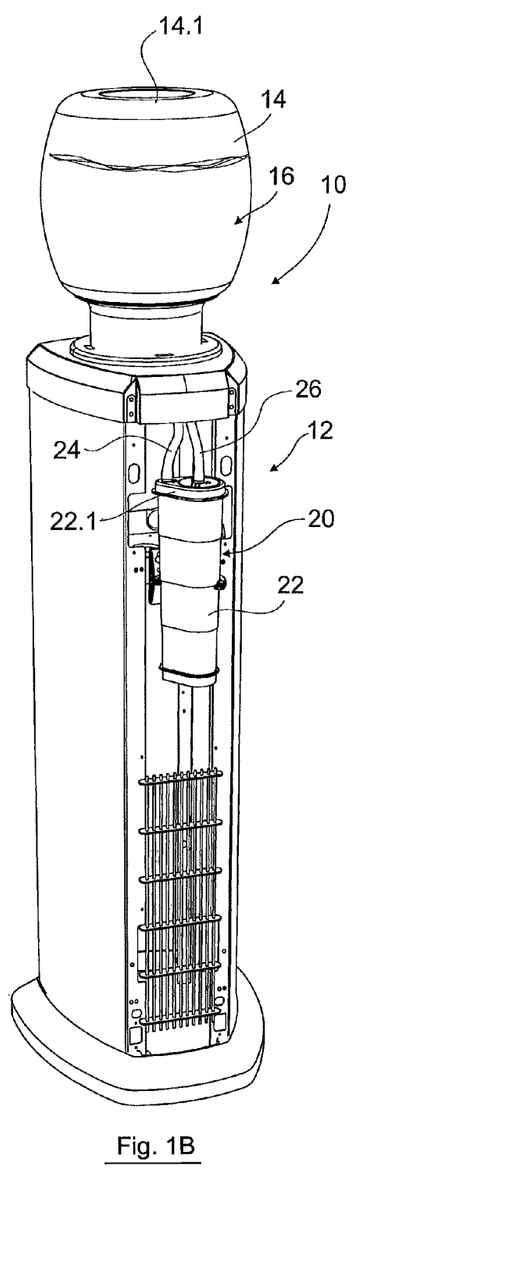
FIG. 1b shows an oblique three-dimensional rear view of a water cooler including a filtration system in accordance with one aspect of the invention.

In one embodiment of the invention, shown in FIGS. 1a and 1b, there is provided a water dispenser 10 comprising a water reservoir 14 for retaining water 16 to be dispensed in a user-activated flow-interruption manner via dispensing spouts 18. The dispenser 10 comprises a filtration unit 20 in fluid flow connection with the water 16 in the reservoir 14, the filtration unit 20 being located externally to the water reservoir 14.

As such, the invention also comprises a filtration system 12 for a water dispenser 10, the filtration system 12 comprising the filtration unit 20 connected in fluid flow with the water 16 contained in the reservoir 14 of the water dispenser 10, with the filtration 20 unit provided externally to, i.e. outside of, the water reservoir 14. The filtration unit 20 generally comprises a housing or magazine 22 for receiving a filter cartridge (not shown) internally therein. The housing 22 is UV impervious, to inhibit the growth of water-fouling or pathological organisms therein. The filtration unit 20 includes a press-fit or screw-top cap 22.1 for securely closing the housing 22. The cap 22.1 provides for quick and easy removal and replacement of spent filter cartridges.

The filtration unit is connected to the reservoir 14 via a first inflow conduit 24 for receiving water 16 from the reservoir 14, and a second outflow conduit 26 for channelling filtered water from the filtration unit 20 via a chill tank, discussed hereinafter, to the dispensing spouts 18. The inflow 24 and outflow conduits 26 are in the form of tubes or plastic piping and are connected, in the embodiment shown, to the cap 22.1 of the filter unit. In other embodiments (not shown), the conduits 24, 26 are connectable to the operative top or bottom of the filtration unit 20. In one embodiment, both the inflow 24 and outflow conduits/tubes 26 are connected to the cap 22.1 in a radially opposed fashion.

Typically, the filtration unit 20 is affixed to the dispenser 10 such that the unit 20 is slightly lower than the lowest water level of the reservoir 14. This, combined with the unique flow paths defined by the filtration system 12 as discussed hereinafter, ensures adequate water flow rates and pressurisation through the filtration unit 20 irrespective of the water level of the water 16 remaining in the reservoir 14. The cross-sections and lengths of the conduits 24, 26, as well as the dimensions of the water filtration unit 20, allow the filtration unit 20 to be positioned lower than the reservoir 14, yet still remain adequately pressurised to ensure sufficient fluid flow through the filtration unit 20, chill tank (discussed hereinafter), and dispensing spouts 18. As such, this allows the filtration unit 20 to be placed at or near ground level. The cross-sections and lengths of the conduits 24, 26 have thus been calculated and designed to ensure sufficient fluid flow of approximately 1 L or more per minute through the filtration system 12.

Figure 2:
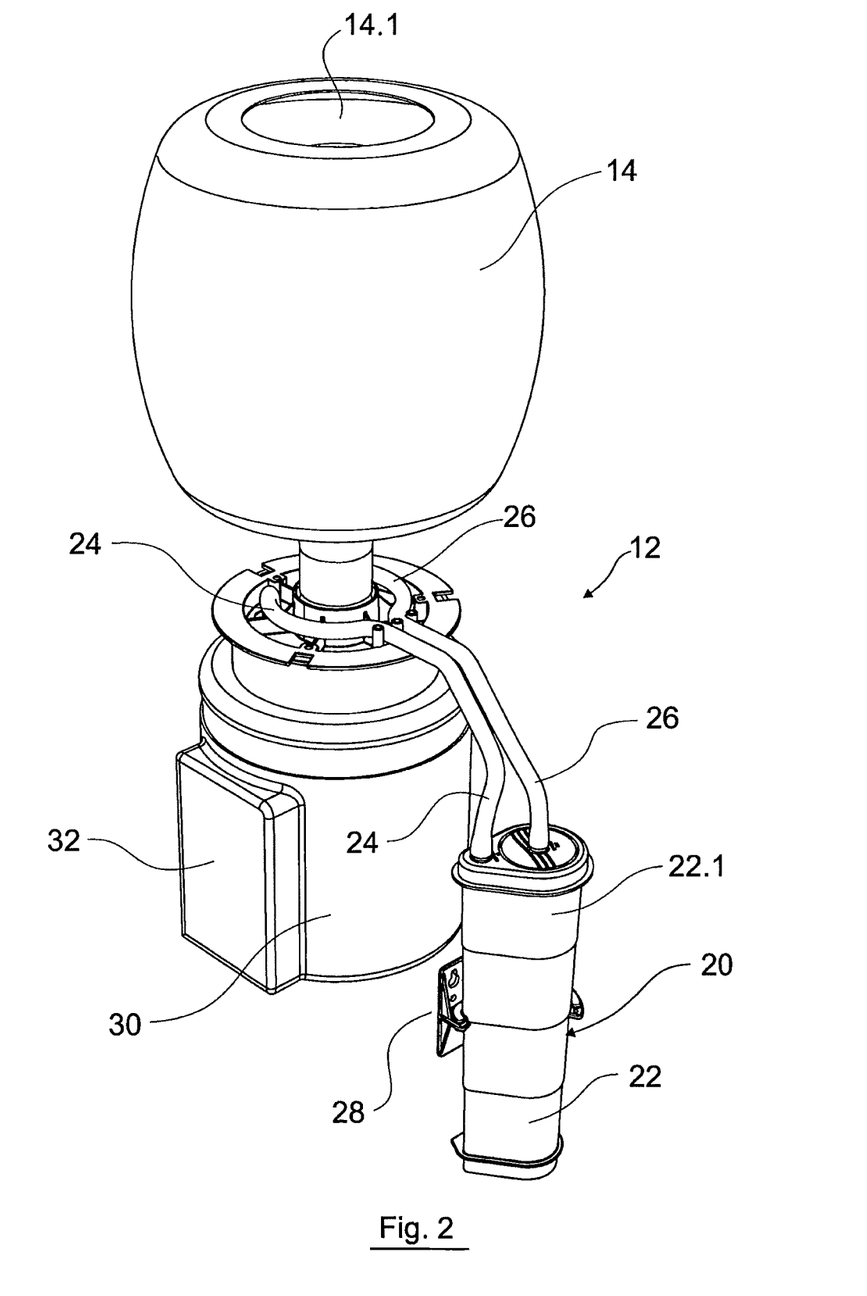
FIG. 2 shows an oblique rear view of the filtration system in accordance with one aspect of the invention.

The filtration unit 20 is attached to the dispenser 10 using flange plates 28, best seen in FIG. 2.

A secondary tank in the form of a chill tank 30 is interposed between the filtration unit 20 and the dispensing arrangement 18. The chill tank 30 is best seen in FIG. 2. The chill tank 30 usually has a capacity, in certain embodiments, of about 3 L, while in other embodiments this may be as high as 12 L or more. The chill tank 30 is cooled using a heat exchanger, part of which is indicated in FIG. 2 by reference numeral 32. The heat exchanger 32 is external to the water dispenser 10 and is connected to a standalone power supply or to a mains electricity supply.

Figure 3A:
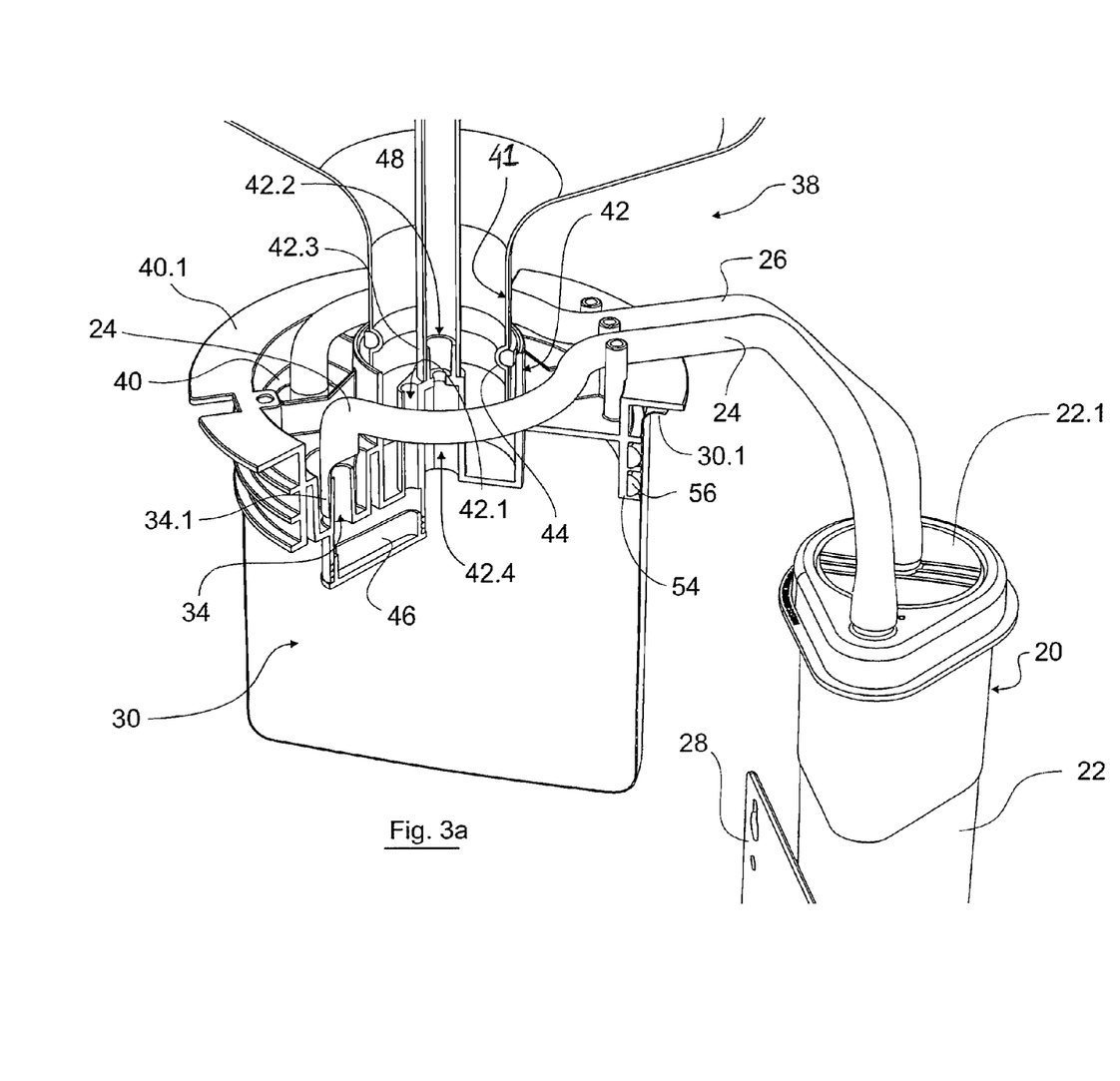
FIG. 3a shows a partially cut-away view of a filtration system in accordance with one aspect of the invention.
Figure 3B:
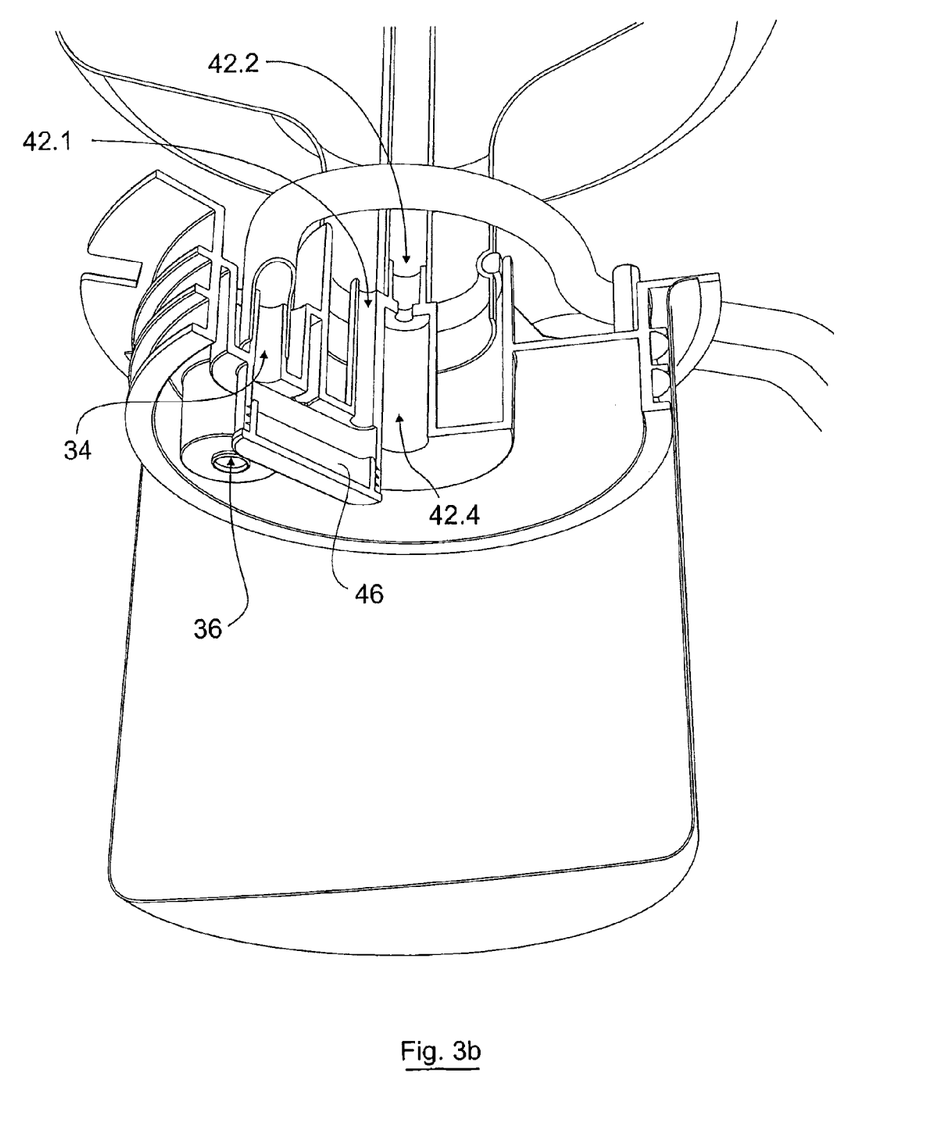
FIG. 3b shows a partially cut-away view of a filtration system in accordance with one aspect of the invention.

FIGS. 3a and 3b shows a cross-sectional perspective view of a filtration system 12 of the invention. The inflow 24 and outflow 26 conduits are connected respectively to throughbore ports 34, 36 defined in a connector hub, the connector hub indicated generally by reference numeral 38. The connector hub 38 is thus provided with spaced ports 34, 36 for receiving the inflow 24 and outflow 26 conduits leading to and from the filtration unit 20. As such, the connector hub 38 comprises an annular dish 40 having the two throughbore ports 34, 36 disposed thereupon. In the embodiment shown, the ports 34, 36, are countersunk into the dish 40, although it will be appreciated that in certain embodiments the ports 34, 36 need not be countersunk.

Importantly, the connector hub 38 also provides an integrally formed collared seating formation, indicated by reference numeral 42, provided centrally on the dish 40, the seat formation 42 serving to securely seat the neck or fluid outlet 14.1 of the water reservoir 14.

The ports 34, 36 are each provided with a tapered ends 34.1 providing a male frusto-conical sealing surface engageable with a conforming internal surface of each of the conduits 24, 26. The port 34 also includes an outlet formation to which the inflow conduit 24 is connected.

The dish 40 is stepped and an integral annular flange 40.1 extending peripherally around the dish 40 is defined along an operatively upper edge of the dish 40. The flange 40.1 provides for secure location of the connector hub 38 on an upper edge or lip 30.1 of the chill tank 30.

The collared seat formation 42 is provided centrally on the dish 40, to ensure sufficient stability of the water dispenser 10 when the reservoir 14 is inverted and placed thereupon. The seat formation 42 is provided with an internal circumferential seal 44 to ensure a snug, water-tight fit with the neck or outlet 14.1 of the water reservoir 14 when inserted in the seat formation 42. The seat formation 42 further has an internal ported aperture 42.1 defined therein through which water 16 from the reservoir 14 is led to the filtration unit 20 via a U-tube conduit 46, which in turn is connected to an operatively downwardly depending port 34.1. It is to be appreciated that any other suitable connector piece may be used apart from a U-tube shaped conduit. From the filtration unit 20, filtered water travels via the conduit 26 to the chill tank 30 via port 36 provided in the dish 38. Water in the chill tank 30 is then dispensed from the dispenser 10 via the spouts 18.

In use, once the reservoir 14 has been filled with water 16, a steady flow of filtered, chilled water is provided upon activation of the spout 18 by a user. Upon activation, water 16 flows from the reservoir 14 though the port 42.1, via the U-tube conduit 46, through port 34 to the filter inflow conduit 24, leading to the filtration unit 20, and from the filtration unit 20 into the chill tank 30 via the further port 36 defined within the connector hub 38, from where it is dispensed via the spouts 18.

A bleed hole or vent 42.2 is provided in fluid flow connection with the chill tank 30 to allow for the escape of air when the chill tank 30 is being filled with water, and to similarly allow for the ingress of air when the chill tank 30 is being emptied during dispensing. In one embodiment of the invention, the bleed hole 42.2 is defined as an aperture within the water reservoir seat 42, with an upwardly extending snorkel tube or vent tube 48 to guide air escaping from the chill tank 30, through the bleed hole 42.2, to an upper part of the water reservoir 14.

The bleed hole 42.2 is defined centrally in the seat 42 and is in the form of a through-bore male connector port 42.3 to which the snorkel tube 48 is attachable in a friction fit manner.

The port 42.3 once again is provided with a tapered end providing a male frusto-conical sealing surface engageable with a conforming internal surface of the snorkel tube 48. The port 42.3 further defines a small antechamber 42.4 proximal the chill tank 30, the antechamber having a sufficiently elevated apertured ceiling to ensure that water from the chill tank 30 does not enter the snorkel tube 48, while allowing air bubbles to escape into the snorkel tube 48.

Figure 4:
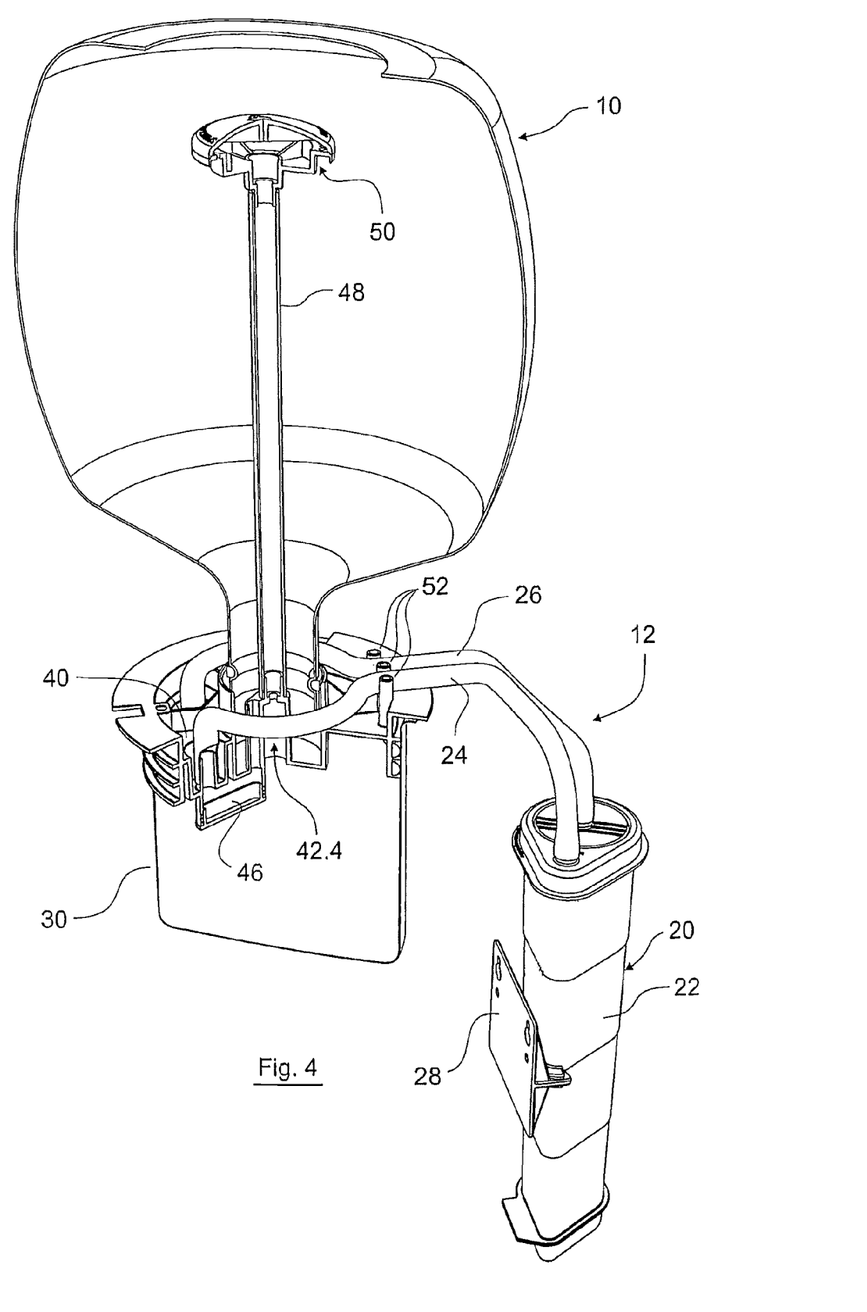
FIG. 4 shows another partially cut-away view of a filtration system in accordance with one aspect of the invention, in which the reservoir and air filter are shown.

An operatively upper end of the snorkel tube 48 terminates in an air filter 50 (best seen in cross-section in FIG. 4) for filtering air drawn into the chill tank during dispensing. FIG. 4 also shows an upper aperture 14.1 into which water may be poured when required. A removable lid enclosing the reservoir is provided (not shown).

As may be seen in FIG. 4, the connector hub 38 is provided with three lugs 52 positioned on the flange 40. The lugs 52 define friction fit guides for the inflow 24 and outflow 26 conduits leading to and from the filtration unit 20 and the chill tank 30.

The connector hub 38 is of unitary construction rendered using injection moulded processes. As such, it is made of a high density plastics material, typically high density molecular polyethylene (HDMPE). The connector hub 38 is also provided with an operatively downwardly extending circumferential skirt 54, best seen in FIG. 3. The skirt 54 is dimensioned to allow for the secure placement of a circumferential D-ring seal, indicated generally by reference numeral 56. The skirt 54 and seal 56 ensure a water-tight seal between the connector hub 38 and the chill tank 30, allowing the hub 38 to be press-fit into the chill tank 30 and eliminating the need for further securing means to be applied.

The filtration unit is provided with any suitable water filtration cartridge, which a person in the art may select to ensure a flow rate of not less than 0.5 L per minute through the filtration unit. This is obviously also dependent on the type of filter cartridge used, and a person skilled in the art will be able to select a suitable filter to ensure adequate fluid flow through the filtration unit and a desired level of filtration.

As such, the invention also provides a retrofittable water filtration kit for a water dispenser, the kit comprising a filter housing 22 and cap 22.1 as defined hereinbefore, conduits 24, 26 for connecting the water filter housing 22 to the reservoir 14 and dispensing spouts 18 respectively in fluid flow connection, and a connector hub 38 as defined hereinbefore. The kit also includes an operation and installation manual, and includes a filter cartridge having sufficient flow characteristics and/or density suitable for use in the filtration system of the invention.

It is an advantage of the filtration system of the invention that the system may be retrofittable to existing water coolers or water dispensers, and that it allows for the filtration of water in a gravity fed system without the need for the filter cartridge to be exposed to direct sunlight, as is the case with other gravity-fed filtration systems of which the Applicant is aware. As such, the system acts as a diverter in diverting the main flow of fluid from the reservoir through the filter before returning same to the chill tank.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A water dispenser comprising a water reservoir for retaining water to be dispensed, a dispensing arrangement for flow-interruptible dispensing of water from the reservoir and a filtration unit in fluid flow connection with the reservoir, the filtration unit being located externally to the water reservoir;
    wherein the filtration unit is connected to the reservoir and to the dispensing arrangement via a first inflow conduit for receiving fluid from the reservoir and a second outflow conduit for channeling filtered water from the filtration unit to the dispensing arrangement and the water dispenser comprises a connector hub comprising a seating formation for receiving and seating the water reservoir in an inverted arrangement:
    wherein the connector hub comprises a dish comprising first and second connectors for receiving the first inflow conduit and the second outflow conduit.

2. A water dispenser according to claim 1, wherein the filtration unit comprises an opaque and/or UV impervious housing or magazine for receiving a filter cartridge.

3. A water dispenser according to claim 1, wherein the filtration unit is positioned such that it is at, or below, the lowest water level of the reservoir.

4. A water dispenser according to claim 1, wherein the connector hub is of unitary construction in the form of a moulding or extrusion made of high density plastic.

5. A water dispenser according to claim 1, wherein the connector hub is provided with an operatively downwardly extending circumferential skirt.

6. A water dispenser according to claim 1, wherein the filtration unit is retrofittable to existing water coolers or water dispensers, by use of conduits to connect in fluid flow connection a water filter housing to the reservoir and the dispensing spouts, respectively, and a connector hub.

7. A water dispenser according to claim 1, wherein the seating formation is in the form of an operatively upwardly extending collared formation provided on an operatively upper face of the dish.

8. A water dispenser according to claim 1, wherein the seating formation comprises an internal aperture through which water from the water reservoir is led to the filtration unit.

9. A water dispenser according to claim 8, wherein the internal aperture is provided in the form of a through-bore supplementary ported connector to which is connectable a conduit leading toward the fluid outflow connector defined in the dish.

10. A water dispenser according to claim 9, wherein the connector hub comprises a U-tube conduit or other connector piece in fluid communication with the supplementary ported connector and the inflow conduit leading to the filtration unit.

11. A water dispenser according to claim 9, wherein the connector hub comprises a further ported connector in fluid communication with the outflow conduit from the filtration unit to direct water into a chill tank.

12. A water dispenser according to claim 1, wherein the water dispenser comprises a secondary tank.

13. A water dispenser according to claim 12, wherein the dish comprises a raised annular flange for secure seating of the connector hub on an upper edge of the secondary tank.

14. A water dispenser according to claim 12, wherein filtered water from the filtration unit is fed to the secondary tank via the first connector provided in the dish.

15. A water dispenser according to claim 12, wherein the secondary tank is a chill tank interposed between the filtration unit and the dispensing arrangement.

16. A water dispenser according to claim 15, wherein a bleed hole or vent is provided in fluid flow connection with the chill tank to allow for air to escape when the chill tank is being filled and to allow for the ingress of air when the chill tank is being emptied during dispensing.

17. A water dispenser according to claim 16, wherein the bleed hole is defined within the seating formation of the connector hub, further comprising an upwardly extending snorkel tube or vent tube to guide air escaping from the chill tank, through the bleed hole, to an upper part of the water reservoir, above a water line.

18. A water dispenser according to claim 17, wherein the bleed hole is in the form of a through-bore male connector to which the snorkel tube or vent tube is attachable in a friction fit manner.

19. A water dispenser according to claim 18, wherein the through-bore male connector comprises an antechamber proximal the chill tank.

\* \* \* \* \*